United States Patent Office 3,574,030
Patented Apr. 6, 1971

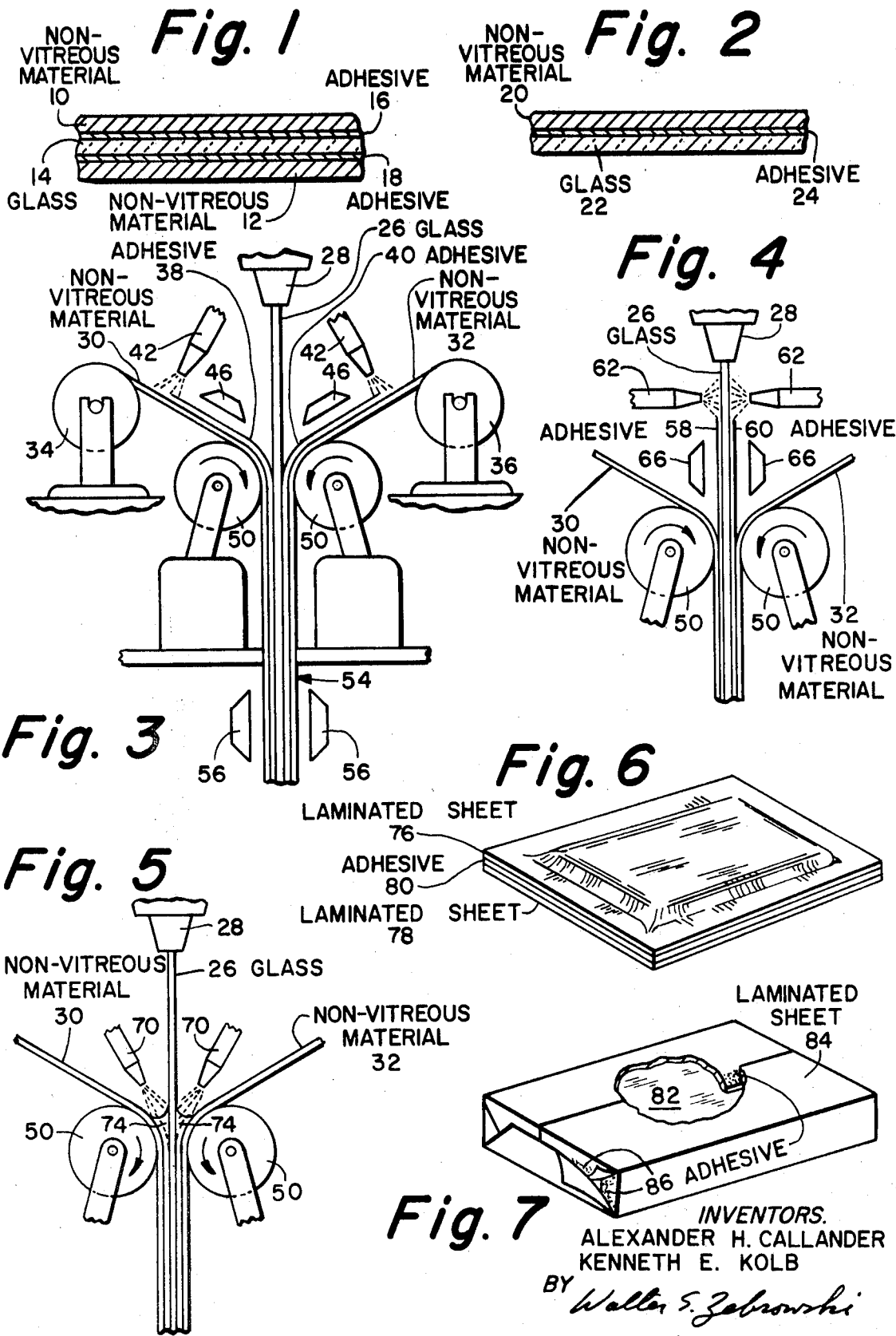

3,574,030
METHOD OF MAKING FLEXIBLE GLASS LAMINATES
Alexander H. Callander, Big Flats, N.Y., and Kenneth E. Kolb, Peoria, Ill., assignors to Corning Glass Works, Corning, N.Y.
Continuation-in-part of application Ser. No. 186,433, Apr. 10, 1962. This application July 22, 1968, Ser. No. 746,675
Int. Cl. B29b 3/02; B32b 7/02, 17/10
U.S. Cl. 156—244                          20 Claims

ABSTRACT OF THE DISCLOSURE

This invention relates to a method of making a thin flexible laminated structure formed of a thin glass sheet having a thickness of less than about 0.005 inch and at least one thin sheet of flexible non-vitreous material permanently adhered or bonded to the glass sheet.

CROSS REFERENCE TO RELATED APPLICATION

This application is a continuation-in-part of application Ser. No. 186,433, filed Apr. 10, 1962, and now abandoned.

BACKGROUND OF THE INVENTION

Packaging materials such as coated or uncoated paper, paperboard, organic plastic films, metallic foils and the like have long been known. Such materials are used extensively because they are low in cost, readily available, easily formed into desired shapes, suitable for printing and decorating, and provide a suitable short term storage package for food and other commodities. Such materials, however, do not form an oxygen and water vapor barrier, because they are either naturally permeable or have pinholes resulting from manufacturing processes or handling, and therfore cannot be used for long term storage without spoilage of the contents of the package formed therefrom.

SUMMARY OF THE INVENTION

It is an object of this invention to provide a laminated material which is substantially impervious to oxygen and water vapor.

It is another object of this invention to provide a laminated material which is thin and flexible.

A further object of this invention is to provide a laminated packaging material that can be readily formed into a desired shape.

A still further object is to provide a packaging material that is readily sealable.

A still further object is to provide an impervious packaging material that may be used with conventional packaging machines.

Additional objects, features, and advantages of the present invention will become apparent, to those skilled in the art, from the following detailed description and the attached drawings, on which, by way of example, only the preferred embodiments of this invention are illustrated.

We have found that such objects can be achieved by forming a laminated structure comprising a sheet of glass having a thickness ranging from monomolecular to about 0.005 inch and at least one thin sheet of a flexible non-vitreous material adhered to said glass. As is obviously seen and readily understood by one familiar with the art, to be useful for its intended purposes as herein set out, the laminated structure of the present invention must not be of such character or structure as to lend itself to delamination prior to its use since clearly it would be rendered inoperative. Accordingly the laminae of the present invention are termed permanently adhered or bonded to one another, that is for the life of the structure, and in this manner forming a permanently laminated structure. This is to be distinguished from temporary laminated structures where a lamina is temporarily adhered to another for purposes such as strength during handling, portability, and the like and thereafter removed prior to being put to its intended use.

Glass has a number of unusual and desirable properties not present in most packaging materials. It is hard, substantially chemically inert, and impervious to oxygen and water vapor. Glass, however, is inherently brittle and in ordinary thickness, not very flexible. In thicknesses of 0.02 inch or less, glass is flexible and can be bent and curved into various shapes. Such thin sheets of glass, however, are fragile, brittle, and readily broken. Sheets having a thickness of about 0.001 inch or less, are so fragile that they do not support themselves in any substantial size, therefore, manufacturing of such thin sheets for many useful purposes is difficult.

It has been found, however, that by laminating a thin glass sheet having a thickness of les than about 0.005 inch, which sheet is otherwise extremely fragile, with at least one thin sheet of flexible non-vitreous material having a thickness of less than about 0.010 inch, a laminated structure is produced which is very durable and flexible while being impervious, and one which can be easily handled, formed, shaped, reeled, printed, and the like without breakage. Thin sheets of non-vitreous materials suitable for the purposes of this invention, such as those hereinafter described in detail, are quite flexible, the degree of flexibility of which is substantially that required of the laminated structure of this invention for the purposes of this invention. It has been found that laminating a thin glass sheet, having a thickness of less than about 0.005 inch, to such flexible non-vitreous sheets, does not make the resulting structure significantly less flexible than the sheets of non-vitreous materials alone. However, as the thickness of the glass sheets is increased beyond about 0.005 inch, the inherent brittle nature of the glass sheet tends to control the overall flexibility of the composite structure, thus rendering the structure less flexible, and consequently unsuitable for the purposes of this invention.

In accordance with the method of this invention, laminating is performed as part of the glass forming process thereby enabling the manufacture of substantailly continuous sheets.

BRIEF DESCRIPTION OF THE DRAWINGS

In the drawings,
FIG. 1 is a cross sectional view of a laminated structure of this invention.
FIG. 2 is a cross sectional view of another laminated structure of this invention.
FIG. 3 is a side elevation of a suitable apparatus for carrying out the process of this invention.
FIG. 4 is a side elevation of an apparatus similar to that shown in FIG. 3, illustrating another method of applying an adhesive to form the structure of this invention.
FIG. 5 is a side elevation of an apparatus similar to that shown in FIG. 3, illustrating still another method of applying an adhesive to form the structure of this invention.
FIG. 6 is an oblique view of a package in the form of a pouch employing the laminated material of this invention.
FIG. 7 is an oblique view of a package employing the laminated material of this invention.

DETAILED DESCRIPTION

FIG. 1 illustrates a laminated structure of the present invention. Thin sheets, 10 and 12, of a flexible, non-vitreous material are adhered to each flat surface of a thin glass-sheet 14 by means of adhesives 16 and 18. Sheets 10 and 12 may be of the same material or of dissimilar materials, that is sheet 10 may be formed of material different than the sheet 12. Examples of suitable materials are given hereinafter. A material is dissimilar or different from another if it has a different composition than the other resulting from either different constituents or different proportions of ingredients.

FIG. 2 illustrates another embodiment of this invention where a thin sheet 20, of a flexible non-vitreous material, is adhered to one surface of a thin glass sheet 22 by means of adhesive 24.

The composition of the glass sheets used in the laminated structure of this invention is not critical. Any glass which may be formed in thicknesses of less than about 0.005 inch is suitable and may be readily selected by one familiar with the art.

Although this invention is described in respect to packaging materials, the laminated structure may be suitably shaped, prepared and used for any of a large variety of purposes, some of which are described hereinafter. A suitable flexible, non-vitreous material is determined by the ultimate use of the structure. Examples of suitable flexible non-vitreous materials are paper, paperboard, polyurethane, polyethylene, polystyrene, polyvinyl chloride, polyvinylidene chloride, nylon, polyesters, cellulosics, co-polyesters, metallic foil, cloth and the like.

The adhesive used will, of course, depend on the material of the laminae. It may be a solvent or emulsion type, or a non-solvent type such as a heat, pressure, or radiation sensitive adhesive. Examples of suitable adhesives are acrylonitrile rubber, alkyds, phenolics, polyacrylates, polyamides, polyvinyl alkyl ethers, polyvinyl acetals, polyvinyl chlorides, polyurethanes, epoxies, and the like. Where the adhesive is a solvent or emulsion type, it is desirable to remove the solvent by volatilization prior to forming the laminated structure to prevent subsequent gas or moisture entrapment between the laminae. It should be noted, however, that such solvent removal may not be necessary prior to forming the laminated structure where the outer lamina is a highly porous and absorbent material such as paper, for example. Non-flammable adhesives, such as water-based adhesives, are preferred when they are applied in close proximity to the hot body of molten glass from which the glass sheet is being drawn. A suitable adhesive may be readily selected by one familiar with the art.

FIG. 3 illustrates a method for carrying out this invention. A thin glass sheet 26, is formed by nozzle 28. Thin glass sheet 26 may be drawn from a molten supply as is known to one familiar with the art. Flexible, non-vitreous material sheets 30 and 32 are dispensed from reels 34 and 36, said sheets 30 and 32 being of the same or dissimilar material, as desired. Layers 38 and 40 of adhesive material are applied to sheets 30 and 32 respectively by spraying with nozzles 42. Sheets 30 and 32 with layers 38 and 40 applied thereto are heated by means of heaters 46 to remove the adhesive solvent by volatilization. If the adhesive used is not of the solvent or emulsion type, the heating step is not required.

Sheets 30 and 32 are then passed over pulling rolls 50 and disposed with layers 38 and 40 adjacent to the flat surfaces of glass sheet 26. Rolls 50 not only pull sheet 26 completing the glass forming operation but also pull sheets 30 and 32 and exert a force perpendicular to the path of the laminae, thereby effecting adhesion of the various materials. The said rolls may, at least in part, control the thickness of the laminated structure by the spacing between them. The laminated structure 54 may then be heated by heaters 56, to cure the adhesives if such curing is required for the particular adhesive used.

FIG. 4 illustrates another method of applying the adhesive. Layers 58 and 60 of adhesive material are sprayed onto the flat surfaces of glass sheet 26 with nozzles 62, and the sprayed glass sheet is thereafter adhered to sheets 30 and 32 by means of pulling rolls 50 in the same manner as described above. Heaters 66 are provided to volatilize the adhesive solvent if a solvent or emulsion type adhesive is employed.

FIG. 5 illustrates still another method of applying the adhesive. Nozzles 70 flow adhesive material into each "V" formed by the glass sheet 26 and the flexible, non-vitreous material sheets 30 and 32, forming puddles 74. Pulling rolls 50 then act as "squeegees" and allow only that thickness of adhesive material to remain between the various laminae as determined by the spacing of said rolls.

The adhesive may also be applied by passing the formed sheet of glass through a slot in a container filled with adhesive material located above the pulling rolls. The width of the slot will aid in controlling the thickness of adhesive applied.

The adhesive may be applied to flexible non-vitreous material sheets before reeling, thereby eliminating the need for spraying or flowing of the adhesive material at the point of lamination. Such adhesives may be of a variety of types including heat, pressure or radiation sensitive adhesives. Other methods of applying adhesives are brushing, roller-coating, dipping, knife-coating or the like.

Printing, coloring, decorating or the like of the laminated structure can be accomplished by many methods well known in the art. This may be done prior to laminating, such as for example, printing on the flexible, non-vitreous sheet, concurrent with the laminating process by, for example, employing a colored adhesive, or after the laminated structure has been formed.

FIG. 6 illustrates a commodity pouch formed from the laminated material of this invention. Laminated sheets 76 and 78, consisting of two sheets of flexible non-vitreous material bonded to the flat surfaces of a thin glass sheet, are disposed in a substantially coextensive and coplanar relationship, and are sealed together at their peripheral edge areas by means of adhesive 80. As is readily understood by one familiar with the art and as is clearly illustrated in the drawing, the expression "substantially coplanar relationship" as used herein in connection with commodity pouches means that each of the pouch sheets is in a side by side relationship with the other sheet and to an extent lies in planes somewhat parallel to that of the other sheet, that is the sheets are juxtaposed. Where a pouch is formed of one folded sheet, as hereinafter described, this term means that the pouch sides are in such relationship. If the flexible non-vitreous material sheets comprising the sealing and inner surfaces of the pouch, are of a heat sealable material, such as for example, polyethylene, the pouch may be sealed by heat and pressure without the use of an adhesive. Such heat sealing is well known in the art. A pouch similar to that illustrated in FIG. 6 may also be formed from one sheet of the laminated material of this invention. In this embodiment, the sheet would be folded to form two substantially coextensive and coplanar sides of the pouch and heat sealed, or sealed by means of an adhesive as described above, along three sides excluding only the folded side.

FIG. 7 illustrates a package formed from the laminated material of this invention. A commodity 82, is wrapped with a laminated sheet 84, consisting of two sheets of flexible non-vitreous material bonded to the flat surfaces of a thin glass sheet. In wrapping said commodity the edges of sheet 84 are overlapped to facilitate sealing of the package. The package is then sealed by means of adhesive 86. If the outer laminae of sheet 84 are composed of a heat sealable material, the package may be heat sealed as described above without the use of an adhesive. By the term commodity as used herein is meant an article of commerce including any article, product or item.

Typical examples of practicing the instant invention are illustrated by the following:

Example 1

A paper-glass-paper laminated structure may be prepared by spraying an adhesive comprising a 45% aqueous emulsion of polyethyl acrylate on a substantially continuous glass sheet, having a thickness of 0.0004 inch and a width of about 20 inches, while the sheet is being drawn. While the adhesive is still moist the sprayed glass is passed between two sheets of commercial 30 pound kraft paper and the paper is adhered thereto by means of pulling rolls such as those illustrated in FIG. 4. The laminated structure so formed, is then heated to a temperature of about 150° C. for about 2 minutes to remove the water solvent by volatilization and to cure the adhesive. The resulting structure is flexible, strong, and impervious to oxygen and water vapor.

Example 2

A paper-glass-paper laminated structure may be formed by spraying the adhesive described in Example 1, on the flat surfaces of a thin glass sheet while it is being drawn or as it is otherwise formed, and then heating the coated glass to a temperature of about 235° C. for about 15 seconds to remove the water solvent from the adhesive and make it tacky, the coated glass sheet is passed between two sheets of commercial 30 pound kraft paper and the paper is adhered thereto by means of pulling rolls. The glass may be the size described in Example 1.

Example 3

The sprayed glass described in Example 2 may also be laminated with nylon, polyvinylidene chloride and polyethylene terephthalate or combinations thereof in the same manner as described in Example 2. The laminated structures formed with polyvinylidene chloride or polyethylene terephthalate are particularly suitable for forming pouches, of the type illustrated in FIG. 6, by simply heat sealing the peripheral edges.

Example 4

A glass-aluminum foil laminated structure may be formed by coating one surface of a thin glass sheet having a thickness of about 0.0005 inch and a width of about 20 inches, while the glass sheet is being drawn, with an adhesive comprising 100 parts natural rubber, 100 parts colophony, 55 parts vistac, and 800 parts toluene solvent. The adhesive may be sprayed onto the glass sheet. The coated sheet is then heated to a temperature of about 225° C. for about 30 seconds to remove the solvent by volatilization, and thereafter, the coated side is adhered to aluminum foil and the laminated structure is formed by means of pressure applied by pulling rolls.

Example 5

A paper-glass-polyethylene laminated structure may be formed by spraying a glass sheet having a thickness of about 0.0004 inch and a width of about 24 inches, while it is being drawn, with a hexane solution of 50% by weight of polyvinyl isobutyl ether, volatilizing the solvent by heating the sprayed glass to a temperature of about 150° C. for about 2 minutes, passing the sprayed sheet of glass between one sheet of 30 pound kraft paper and one sheet of polyethylene having a thickness of 0.010 inch and, thereafter bonding the laminae by means of pressure applied by pulling rolls.

Example 6

A paper-glass-polyethylene laminated structure may be formed by spraying one flat surface of each of a kraft paper sheet and a polyethylene sheet with an adhesive comprising 100 parts polyvinyl pyrrolidone, 100 parts of a 20% solution of poly (methyl vinyl ether/meleic anhydride) in n-butanol and 200 parts dinonyl phenol, vaporizing the butanol solvent by heating each of the coated laminae to a temperature of about 125° C. for about 5 minutes, passing a sheet of glass on the draw having a thickness of about 0.0004 inch and a width of about 20 inches, between said coated surfaces of said laminae, bonding said laminae to said glass by means of pressure applied by pulling rolls and, thereafter curing the adhesive by heating the laminated structure so formed to a temperature of about 150° C. for 2 minutes.

Example 7

An organic material sheet-glass-organic material sheet laminated structure may be formed by spraying either both flat surfaces of a glass sheet on the draw or one flat surface each of the organic material sheets with an adhesive coating comprising 80 parts of polyamide of diethylene triamine and dilinoleic acid, 20 parts of a basic epoxy such as diglycidyl ether of bisphenol A, and 3 parts of a reactive diluent such as butyl glycidyl ether. The glass sheet is disposed between the organic material sheets adjacent said adhesive coatings and thereafter the laminae are bonded together by means of pressure applied by pulling rolls. The adhesive used in this example does not contain a solvent and therefore heating is not required before or after laminating, to remove a solvent. Synthetic resinous materials such as nylon, polyethylene, polyethylene terephthalate and the like or combinations thereof may comprise the organic material sheet of this example.

The ratio of the adhesive constituents may be varied widely to obtain desired viscosities, tackiness, strength and peel properties. Such an adhesive may be cured by heating or storing at room temperature.

Example 8

A laminated structure may be formed of a sheet of glass and at least one sheet of a co-polyester of terephthalic and isophthalic acids and ethylene glycol, known as Videne and produced by the Goodyear Tire and Rubber Co., Inc. of Akron, Ohio. The structure may be formed by dispensing a sheet of Videne, having a thickness of about 0.001 inch, adjacent one or both flat surfaces of a sheet of glass having a thickness of about 0.0005 inch and a width of about 24 inches, heating the structure so formed to a temperature of about 180° C. and thereafter bonding the laminae by means of pressure applied by pulling rolls. In this example adhesion between the laminae has been effected by means of heat and pressure.

In the examples heretofore set out, the laminae were bonded by the pressure applied by pulling rolls. Where the laminae are fragile, the surface thereof readily scratched or imperfections readily imparted thereto by excesive presure, it may be desirable to employ pulling belts in place of the pulling rolls. Such pulling belts are well known in the art. Pulling belts would, in addition, distribute the bonding and pulling pressures over a much greater area.

Forming packages from the laminated material of this invention necessitates sealing. As heretofore noted, packages may be heat sealed or sealed by means of adhesives such as those illustrated for laminating the material. Where a pouch or the like is formed, the impervious properties of the package may be maintained by sealing the edges for a substantial distance, for example 1 inch. The entrance of oxygen or water vapor through the seal into the package will be inhibited by the width of the seal. For example, a pouch having 1 inch wide heat sealed edges, will be as impervious to oxygen and water vapor along the seal as a 1 inch thick sheet of the inner lamina material having an area the same as the cross sectional area of the seal. As will be readily understood by one familiar with the art, the width of a package or pouch seal may vary greatly and will be of such distance as to accomplish the desired result or produce an article suitable for the purposes intended. One familiar with the art can readily determine the desired seal width and this invention is obviously not limited to any particular width.

In addition to being thin, flexible, strong, and impervious to oxygen and water vapor, the laminated structure of this invention may also be decorative and electrically non-conductive. Some examples of electrical uses of the laminated structure of this invention are: insulation material; substrate for electroluminescent cells, printed circuits and the like; electrical cable wrapping; substitute for mica; solar shielding material and the like.

The laminated structure of this invention may also be used as a substrate for photographic film or as drafting paper. Optical devices such as lighting fixture panels, flexible light ducts, instrument lenses and the like may be formed from it. Due to its strength and chemical resistance it may be used for storage containers, pipe lining, acid proof cloths, ducting for corrosive fumes, diaphragms, food service equipment, protective coating, gaskets, reinforcing material, pipe wrapping material, lightweight windows and the like.

The laminated structure has been described in terms of one sheet of glass and a sheet of flexible non-vitreous material adhered to one or both of the flat glass surfaces. It is readily seen that a structure having more than one sheet of flexible non-vitreous material laminated to each of the glass surfaces, may be formed by the method of this invention.

Although the present invention has been described with respect to specific details of certain embodiments thereof, it is not intended that such details be limitations upon the scope of the invention except insofar as set forth in the following claims.

We claim:

1. The method of fabricating a laminated structure comprising forming from a molten supply a thin glass sheet having two broad substantially flat surfaces and a thickness of less than about 0.005 inch, applying a substantially continuous coating of adhesive material to said flat surfaces of said glass sheet as it is being formed, disposing a thin, flexible sheet of non-vitreous material in contact with the adhesive material on one of said flat surfaces, disposing a thin, flexible sheet of non-vitreous material in contact with the adhesive material on the other of said flat surfaces, and thereafter permanently bonding said thin, flexible sheets to said glass sheet.

2. The method of claim 1 wherein said bonding comprises applying an effective amount of heat and pressure to the structure so formed, effective to bond said thin flexible sheets to said glass sheet.

3. The method of claim 1 wherein the non-viterous material is paper.

4. The method of claim 1 wherein the non-vitreous material is a synthetic resinous material.

5. The method of claim 1 wherein the non-vitreous material is metallic foil.

6. The method of fabricating a continuous laminated sheet of material comprising drawing from a molten supply a continuous glass sheet having a thickness of less than about 0.005 inch, applying a substantially continuous coating of an adhesive material to the flat surfaces of said glass sheet as it is being drawn, dispensing thin, flexible sheets of non-vitreous material in contact with said adhesive material, and thereafter applying an effective amount of pressure to the structure so formed, effective to bond said thin flexible sheets to said glass sheet.

7. The method of claim 6 wherein the bonding comprises applying an effective amount of heat and pressure to the structure so formed, effective to bond said thin flexible sheets to said glass sheet.

8. The method of claim 6 wherein the non-vitreous material is paper.

9. The method of claim 6 wherein the non-vitreous material is a synthetic resinous material.

10. The method of claim 6 wherein one of the thin flexible sheets is formed of a material different than the other.

11. The method of fabricating a continuous laminated sheet material comprising forming from a molten supply a continuous glass sheet having a thickness of less than about 0.005 inch, applying a substantially continuous coating of adhesive material to one of the flat surfaces of said glass sheet as it is being formed, dispensing a thin flexible sheet of non-vitreous material in contact with the coated surface of said glass sheet, and thereafter applying an effective amount of pressure to the structure so formed, effective to bond said thin flexible sheet to said glass sheet.

12. The method of claim 11 wherein the bonding comprises applying an effective amount of heat and pressure to the structure so formed, effective to bond said thin flexible sheet to said glass sheet.

13. The method of fabricating a continuous laminated sheet material comprising forming from a molten supply a continuous glass sheet having a thickness of less than about 0.005 inch, providing a thin flexible sheet of non-vitreous material, applying a substantially continuous coating of an adhesive material to one flat surface of said thin flexible sheet, disposing said glass sheet in contact with a coated surface of said thin flexible sheet as said glass sheet is being formed, and thereafter applying an effective amount of pressure to the structure so formed, effective to permanently bond said glass sheet to said flexible sheet.

14. The method of claim 13 wherein the bonding comprises applying an effective amount of heat and pressure to the structure so formed, effective to bond said glass sheet to said flexible sheet.

15. The method of fabricating a continuous laminated sheet material comprising forming from a molten supply a continuous glass sheet having a thickness of less than about 0.005 inch, providing two thin flexible sheets of non-vitreous material, applying a coating of adhesive material to one flat surface of each of said thin flexible sheets, disposing said glass sheet in contact with the coated surfaces of said thin flexible sheets as said glass sheet is being formed, and thereafter applying an effective amount of pressure to the structure so formed, effective to bond said thin flexible sheets to said glass sheet.

16. The method of claim 15 wherein the bonding comprises applying an effective amount of heat and pressure to the structure so formed, effective to bond said thin flexible sheets to said glass sheet.

17. The method of fabricating a continuous laminated sheet material comprising drawing a continuous glass sheet having a thickness of less than about 0.005 inch from a molten supply of glass by means of pulling rools, applying a coating of adhesive material to the flat surfaces of said glass sheet while it is being drawn, providing two substantially continuous sheets of thin flexible material, dispensing said sheets of thin flexible material in contact with the coated surfaces of said glass sheet, applying an effective amount of pressure to the structure so formed by said pulling rolls effective to bond said thin flexible material to said glass sheet, and thereafter curing said adhesive material.

18. The method of fabricating a continuous laminated sheet material comprising drawing from a molten supply of glass by means of pulling rolls a continuous glass sheet having a thickness of less than about 0.005 inch after being drawn, applying a coating of adhesive material containing a solvent to at least one flat surface of said glass sheet while it is being drawn, applying heat to said adhesive material from an external source whereby volatilizing said solvent and making said adhesive material tacky, providing at least one sheet of thin flexible material, dispensing said thin flexible material in contact with the coated surface of said glass sheet, said adhesive material being suitable for adhering said thin flexible material to said glass sheet, applying an effective amount of pressure to the structure so formed by said pulling rolls, effective to bond said thin flexible material to said glass sheet, and thereafter curing said adhesive material.

19. The method of fabricating a continuous laminated sheet material comprising drawing from a molten supply a continuous glass sheet having a thickness of less than about 0.005 inch, providing at least one sheet of thin flexible organic material, dispensing said thin flexible organic material in contact with at least one flat surface of said glass sheet as it is being drawn, and thereafter permanently bonding said thin, flexible organic material to said glass sheet by applying an effective amount of heat and pressure to the structure so formed, effective to adhere said flexible organic material to said glass sheet.

20. The method of fabricating a flexible laminated structure comprising forming a molten supply a thin glass sheet having two broad substantially flat surfaces and a thickness of less than about 0.005 inch, applying a substantially continuous coating of adhesive material to one of said flat surfaces as said glass sheet is being formed, disposing a thin, flexible sheet of non-vitreous material in contact with said adhesive material, and thereafter permanently bonding said thin, flexible sheet to said glass sheet by applying an effective amount of pressure to the structure so formed, effective to adhere said thin flexible sheet to said glass sheet.

References Cited
UNITED STATES PATENTS

| 2,366,514 | 1/1945 | Gaylor | 161—65 |
| 2,902,396 | 9/1959 | Reynolds | 229—3.5MF |
| 2,962,471 | 11/1960 | Lang et al. | 156—106 |
| 3,089,801 | 5/1963 | Tierney et al. | 161—165 |

WILLIAM J. VAN BALEN, Primary Examiner

U.S. Cl. X.R.

156—99; 161—165, 185, 192, 194, 197; 206—46; 229—3.5, 87